June 13, 1933.  J. H. HOLMES  1,914,256
STAPLE AND TOOL TO FACILITATE ITS APPLICATION
Filed July 23, 1932
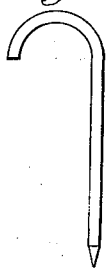
Fig.1.
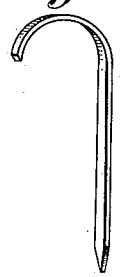
Fig.2.
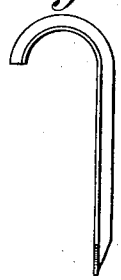
Fig.3.
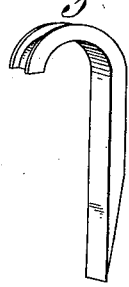
Fig.4.
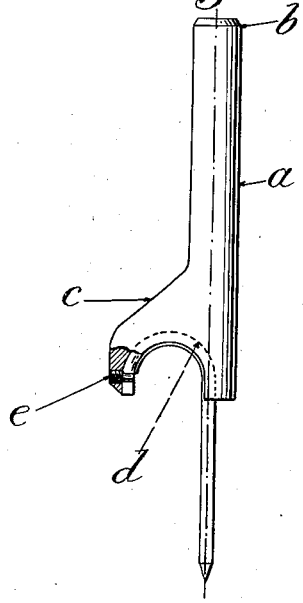
Fig.5.
Fig.6.
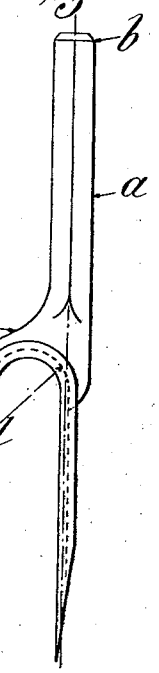
Fig.7.
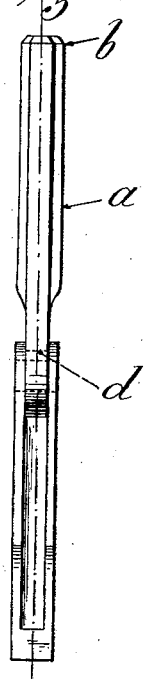
Fig.8.
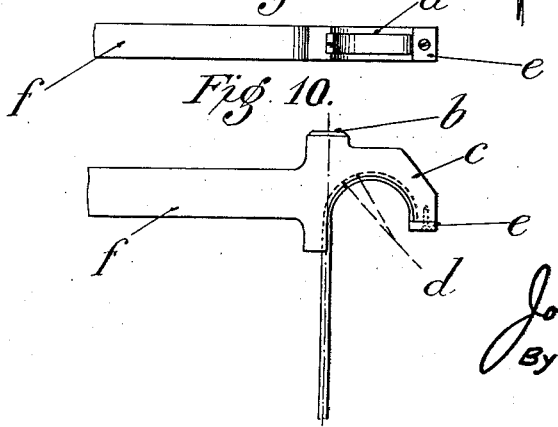
Fig.9.
Fig.10.
Inventor
John Henry Holmes
By Dowell & Dowell
Attorneys

UNITED STATES PATENT OFFICE

JOHN HENRY HOLMES, OF MORPETH, NORTHUMBERLAND, ENGLAND

STAPLE AND TOOL TO FACILITATE ITS APPLICATION

Application filed July 23, 1932, Serial No. 624,327, and in Great Britain July 13, 1931.

This invention has reference to staples or holdfasts and to tools facilitating their application, such staples being used principally for securing various objects fast to a base, such for example as affixing a pipe, electric wire or branch of a tree or plant to a wall.

An ordinary staple of U form having two legs of equal length is in many cases unsuitable for the purpose owing to the difficulty of finding a space between the stones or bricks of the wall which will receive both legs of the staple. Owing principally to this difficulty, many devices have been proposed and are in use, such for instance as a cast or malleable nail having a lead arm projecting from near the head which is bent over the object to be fixed after the nail has been driven into place. Staples or holdfasts with one leg or shank and a hook or curved arm near the top to fit over a pipe or other object to be fixed are usually made in the form of forgings, or are bent out of wire, with a top, head or shoulder which is located approximately in line with the shank and may be struck with the hammer so as to be driven home. Some form of clip held in place by an ordinary nail is also used for the purpose.

If a single legged staple or holdfast has its arm extending from the leg or shank at right angles or more, or at an acute angle to the same, or curved over to such a short radius that the top of the staple is not far from the centre line of the leg or shank, it may be driven into a base without much risk of bending or distorting the shape of either its arm or shank. Such staples or holdfasts therefore are not in question and form no part of this invention.

On the other hand if the shape or length of the arm projecting from the leg or shank is such that the top of the staple which could be hit with a hammer is offset to more than a short distance from the centre line of the leg or shank, there is a strong tendency to bend either in the arm or leg or shank and sometimes in both, when the blow of the hammer is delivered upon the top of the staple.

To obviate this it has hitherto been the practice to design such staples with a special striking head or anvil made integral therewith, and so located that the part receiving the hammer blow is approximately in alignment with the axial line of the leg or shank.

Such striking tops provided on a staple obviously serve no useful purpose after functioning to receive the blow of the hammer and direct the force of the blow directly down the shank while the staple is being driven in. It is moreover often badly placed, making it difficult to hit with the hammer and gives an unsightly appearance to the fastening besides occupying space often required for other objects after the staple has been driven home.

The present invention consists in a simplification of the construction of single legged metal holdfasts or staples such as described, by dispensing altogether with the striking head or shoulder and in substituting therefor a temporary striking top, head or anvil which is applied to the staple only when it is being driven in. This temporary striking top comprises a specially shaped tool made of steel or other metal, one part of which receives the blow of the hammer directing the force of the same down the straight leg or shank and another part being recessed to fit upon the hook or curved arm of the staple so as to hold it firmly for the hammer blows and to also preserve its shape.

By thus dispensing with the integral striking head on the staple, the construction of the same is much simplified, material is saved and the appearance greatly improved. A single temporary striking head moreover may be used for driving an indefinite number of the staples.

As an example of a staple with temporary striking head or tool made according to the invention, I will now describe one suitable for fixing a pipe, cable or other object of circular section to a flat base. The staple itself is in such instance formed of a length of stout wire of suitable section, with one end pointed like a nail and with a small portion of its length at the other end bent over in the form of a near semicircle, the inner curve being adapted to fit over the round surface of the member to be fixed. Such a staple obviously cannot be driven by a hammer blow direct, without bending, or tending to bend, either in the curved arm or the shank portion or both, except into very soft material, because the force of the hammer blow cannot be delivered in the direct line of the staple shank.

To enable these staples to be driven home without difficulty and without material distortion of their shape, I provide a temporary striking head in the form of a specially shaped tool, made of steel or other sufficiently hard material, one part of which receives the blow of the hammer and another part has a recess to firmly hold the staple by fitting over the outer curve of its arm. This recess may be simply a groove in the tool, the same being of sufficient thickness to provide a strong wall to each side of the groove in which to receive the staple arm.

To obviate any tendency to bend the straight part of the staple while it is being driven home, the recess of the tool is offset in relation to a centre line passing through its striking end and the straight shank of the staple when the bent arm or head of the latter is properly placed therein, the force of the hammer blow being thus caused to be directed straight down the centre of the shank. As the curved portion of the staple lies in said recess of the tool, it finds bearing for its entire extent to retain it in shape. The recess is preferably formed at a depth somewhat less than the thickness of the staple to be fitted therein, so that when the staple is driven home, no part of the tool will strike the surface of the part which is being affixed thereby.

The recess is easily formed in the end of the tool by a milling operation with a cutter of such diameter that the curve of its periphery corresponds to the outer curve of the bent end of the staple, and having on both sides thereof smaller cutters of equal diameters of a size to give the required depth to the groove. The periphery of the larger cutter may be shaped to form the groove corresponding to the section or part of the section of the staple, or it may be flat so as to form a straight wall groove. When such a combination cutter is forced into the end of the tool to a distance equal to the radius of the largest diameter, a semicircular groove will be formed, but it is preferable to extend the depth of the cut so that the end of the groove in line with the striking part of the body of the tool is continued tangentially for a short distance and consequently when the staple is inserted in the groove, a portion of the straight shank of the staple will be embraced by the tool which will thus tend to serve as an added support to keep the shank in line with the force of the hammer blow while the staple is being driven in.

When the staple is made from a fairly stiff section of wire, I find that the bent arm or head of the staple retains its shape in the recess of the tool during the driving operation, but if the staple section is small, a stop or abuttment should be provided at the end of the recess opposite to the shank-receiving end against which the extremity of the staple arm may bear so as to be held firmly or kept from sliding in the recess. When the tool is formed with this abutment, staples may be quite successfully driven in, even when made of strip material easily bent in the direction of the curved head of the staple.

The staples may have heads or arms of other than semicircular shape so as to conform for instance to the outline of any particular article to be affixed, in which case the recess in the tool is preferably made in a shape to correspond with the same. The staples need not in every instance be formed out of wire, but may in some cases be advantageously made as castings or drop forgings or otherwise. The material forming the staple may be of circular, T or other cross-sectional shape to give more or less surface contact with the object, or to improve the grip of the shank, as desired, when driven into crevices of walls or into cement or plaster and the like. Where the recess part of the tool is grooved, it is preferably of a section corresponding to the section or part of the section of the staple.

The accompanying drawing illustrates embodiments of the invention.

Figs. 1, 2, 3 and 4 are respectively views of single legged staples of different sectional shape according to the invention, the said figures illustrating staples of round, flat, T, and channel section, and it will be observed that, owing to the absence of striking heads or shoulders, they can easily be made of wire by cutting to length, bending to shape and pointing the ends of the shanks or legs. Although all the staples shown have semi-circular arms like hooks, these may be of other shapes as already stated.

Figs. 5 and 6 are elevations at right angles to each other of one form of temporary striking head or tool, fitted to a staple such as shown in Fig. 1 ready for driving.

Figs. 7 and 8 are similar views of another form of temporary striking head or tool, fitted to a staple such as shown in Fig. 4.

Figs. 9 and 10 represent a modification of the tool of Figs. 5 and 6, fitted to a staple such as shown in Fig. 2, and having a handle at the side instead of the top.

Referring to Figs. 5 and 6, the temporary striking head or tool consists of a round bar $a$ serving as a handle, having a striking face $b$ at the top and an offset portion $c$ with an arcuate bottom edge formed with a recess or groove $d$ which is partly substantially semi-circular to receive the arm portion of the staple, as shown. The shank of the staple fitted therein is so disposed that its centre or axial line extends approximately through the centre of the striking end b. A stop or abutment against which the arm extremity of the staple bears is represented at e, and this as before stated prevents the arm from sliding or moving in the recess while the staple is being driven in.

The modification of this temporary striking head or tool shown in Figs. 9 and 10 has the recess d and the striking part b closer together and is formed with a laterally projecting portion f which serves as a handle.

The tool may also be formed by a member having a recessed portion formed with an open sided groove to receive the staple and with a striking part, the said member being hinged in plier fashion to another member adapted to close the open side of the groove and hold an inserted staple while being driven in and in this modified arrangement the open sided groove of the one member may be closed by a spring or a spring pressed member carried by it.

In most of the examples illustrated it will be observed that the wall of the recess d on one side extends down the shank and thus serves as an added support to keep the shank straight in alignment with the striking part b, but this feature, though desirable, may be dispensed with, and in some instances might even be impracticable.

What I claim is:—

1. A staple comprising a metal piece of uniform and other than triangular cross section formed with a single straight leg portion adapted to be driven by impact into a body and a curved arm portion extending as a direct continuation of the leg and adapted to engage or clamp a fixture; said arm portion being diverged from the leg at other than a right angle thereto and that point in its top upon which a direct blow must fall being substantially offset from the leg.

2. A staple comprising a metal piece of uniform and other than triangular cross section formed with a single straight leg portion adapted to be driven by impact into a body and a lateral arm portion extending as a direct continuation of the leg in a curve diverging gradually therefrom; the end of said arm portion terminating short of convergence into an offset line parallel to said leg and the impact receiving point in said arm portion being disposed in a line between the leg and such parallel line substantially apart from the leg.

3. A staple comprising a metal piece of uniform and other than triangular cross section formed with a single straight leg portion adapted to be driven into a body and a curved arm portion extending laterally as a direct continuation of the leg and adapted to engage over a fixture; said arm portion diverging from the leg at other than a right angle and the impact receiving point therein being disposed too far to one side of the leg for the staple to be struck in the line of the same.

4. A staple comprising a metal piece of uniform and other than triangular cross section formed with a single straight leg portion having a pointed end for driving into a body and an arm portion extending laterally as a direct continuation thereof in the line of a backward curve diverging therefrom at less than a right angle to the same and taking the shape of a wide open mouth the depth of which is not more than the width; the end of said arm portion terminating short of a return in parallel with said leg, and forming an impact receiving point in the arm substantially to one side of the leg.

Signed at the office of the U. S. A. consul at Newcastle-on-Tyne this 11th day of July 1932.

JOHN HENRY HOLMES.